Figure 1:
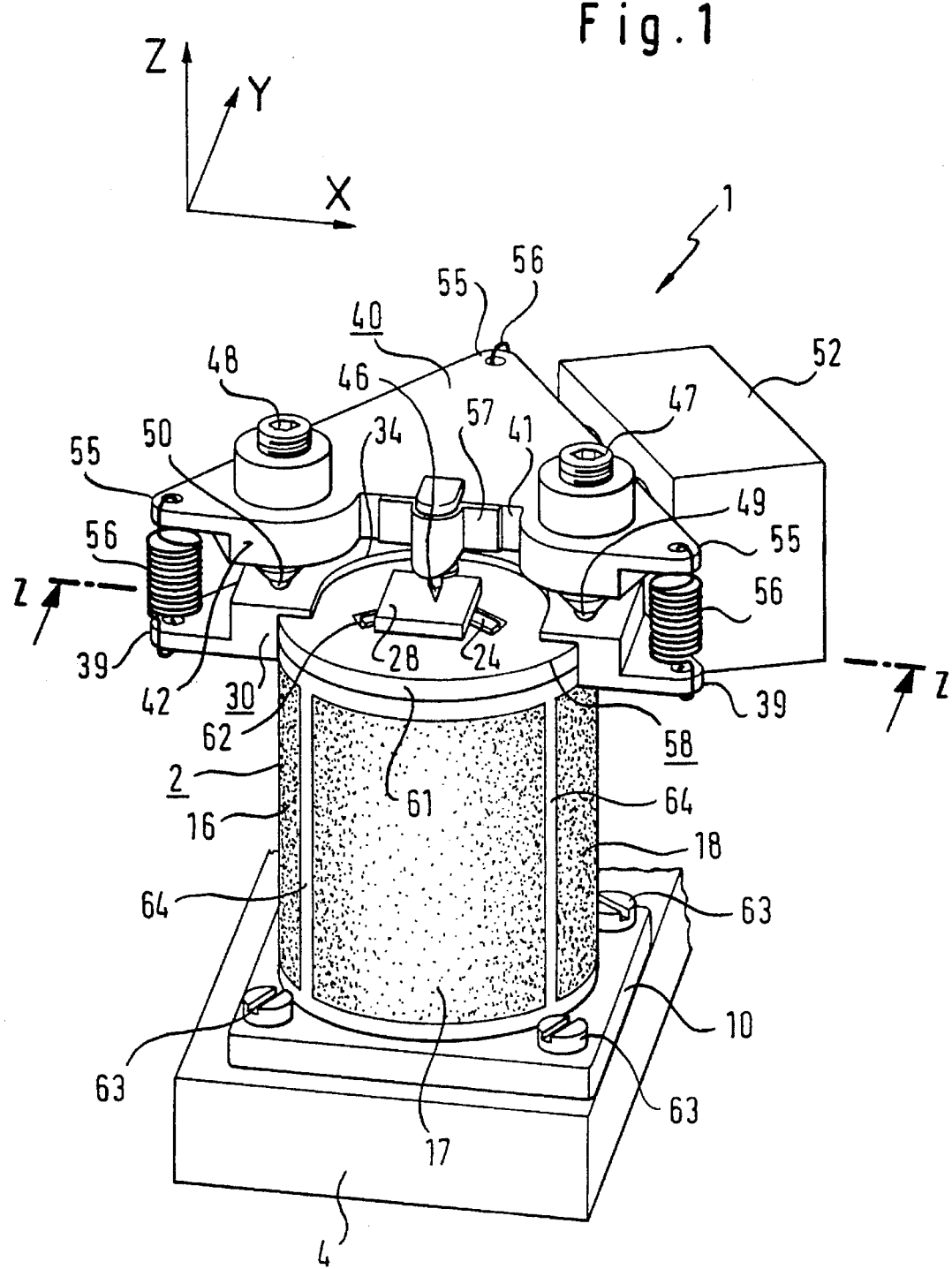

United States Patent [19]
Forster et al.

[11] Patent Number: 5,479,013
[45] Date of Patent: Dec. 26, 1995

[54] STM PROBE

[75] Inventors: Matthias Forster, Teltow; Bernd Tesche, Berlin, both of Germany

[73] Assignee: Max-Planck-Gesellschaft zur Forderung der Wissenschaften e.V., Gottinger, Germany

[21] Appl. No.: 295,371

[22] Filed: Aug. 24, 1994

[51] Int. Cl.$^6$ .................................................. H01J 37/00
[52] U.S. Cl. .................................... 250/306; 250/442.11
[58] Field of Search ............................ 250/306, 442.11; 310/328

[56] References Cited

U.S. PATENT DOCUMENTS

| | | | |
|---|---|---|---|
| 4,841,148 | 6/1989 | Lyding | 250/306 |
| 5,103,094 | 4/1992 | Hayes et al. | 250/306 |
| 5,173,605 | 12/1992 | Hayes et al. | 250/306 |
| 5,306,919 | 4/1994 | Elings et al. | 250/442.11 |
| 5,317,153 | 5/1994 | Matsushiro et al. | 250/306 |

*Primary Examiner*—Bruce C. Anderson
*Attorney, Agent, or Firm*—Thomas K. Ziegler

[57] ABSTRACT

STM probe, in particular for use in an SEM for examining a surface of a sample by STM and/or SEM operation, comprising an outer and an inner piezotube; an object carrier plate mounted on the annular top face of the inner piezotube; a triangular head plate mounted on the annular top face of the outer piezotube and having a recess substantially concentric with the tubes in the triangle side crossing the tubes, the object carrier plate being arranged in this recess with play on all sides; a triangular test-prod attachment plate arranged at a space above the head plate and having a test-prod attachment made of an insulating material in the triangle side passing above the object carrier plate, for receiving a test prod; the corner areas of the plates being provided with fine-thread spindles for setting the space between the plates; and the two plates being held together by means of three springs engaging the corners.

10 Claims, 5 Drawing Sheets

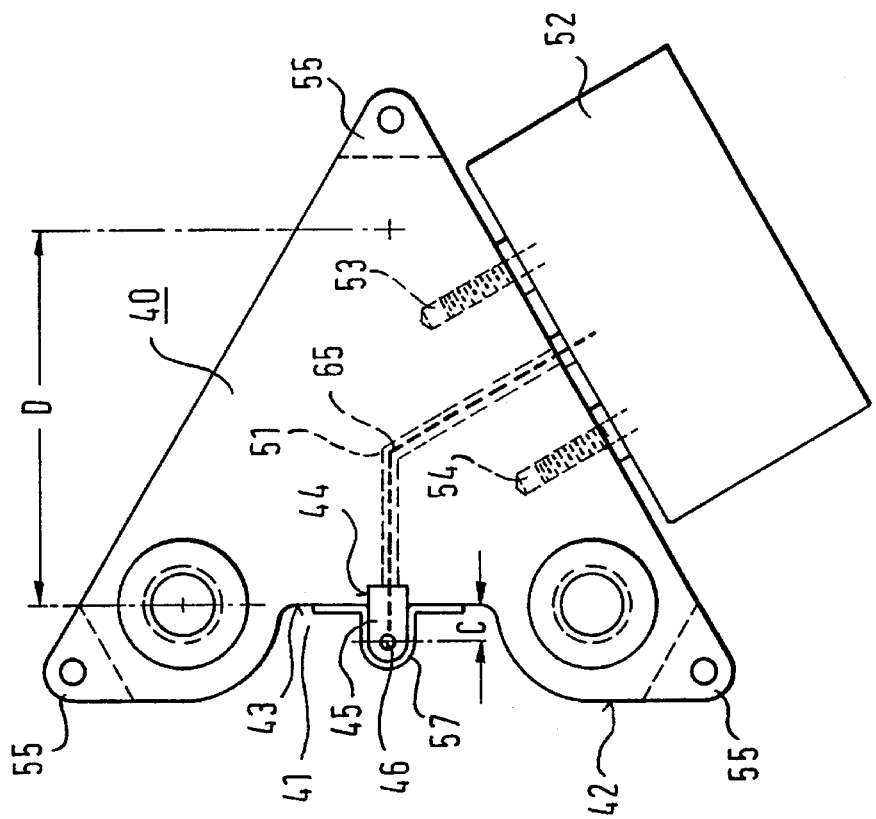
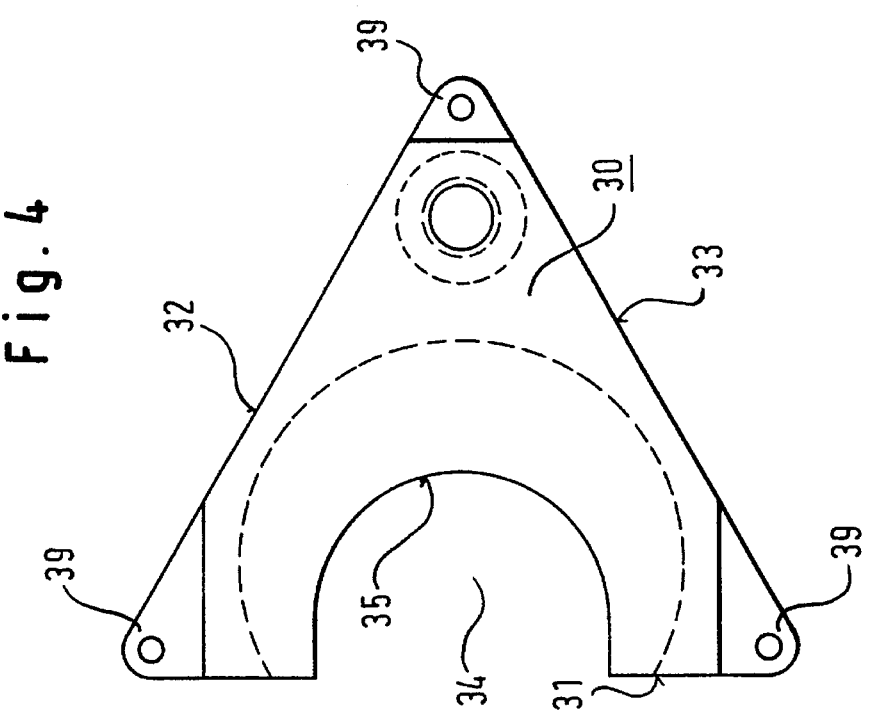

STM PROBE

The on relates to an STM probe, in particular for use in an SEM (Scanning Electron Microscope) for examining a surface of a sample by STM (Scanning Tunneling Microscope) and/or SEM operation.

The combination of SEM and STM, constituting a type of hybrid microscope, is well-known in the prior art. Such a combination represents an efficient means for obtaining topographic images of conductive samples in a broad range of enlargement. The SEM/STM combination therefore allows observations to be carried out in a range from some millimeters down to a few nanometers. Concurrent SEM and STM observations further enable a technique in which the SEM searches the sample for STM target areas, thus allowing the relative position between the sample and the test prod of the STM probe to be coarsely controlled under observation of the sample and the prod by SEM operation. In addition, concurrent operation of both microscopes permits the SEM to observe the intentional or unintentional rough deformation or modification of the sample surface and/or test prod of the STM probe during the STM operation, for instance the effects of a contact between the test prod and the sample surface. This combination further provides the possibility of collating the image information obtained from the STM and the SEM.

In a typical prior art STM probe, the sample to be examined is arranged on an object carrier plate, and the test prod oriented towards the surface of the sample is passed along the sample by means of an orthogonal tripod, consisting of a piezoelectric material, making use of the inverse piezoelectric effect, with one leg of the tripod extending in the direction of the test prod axis (z axis) and the other two legs of the tripod oriented parallel to the sample surface (along the x and y axes) (cf. e.g. "Scanning Tunneling microscope combined with a scanning electron microscope", by Ch. Gerber, G. Binnig, H. Fuchs, O. Marti, H. Rohrer, Rev. Sci. Instrum. (USA), Feb. 1986, vol. 57, no. 2, pages 221–224).

It is further known to fasten the test prod to a small so-called sectored piezotube comprising on its entire inner surface a single electrode for extending and contracting the small piezotube in its axial direction (z axis), and comprising on its outer surface four separate electrodes each covering a cylinder section of almost 90° of the outer circumference, for bending the small piezotube (moving it along the x and y axes). Employing a small piezotube provides the advantage that the thermic drift of the scanner along the x and y axes is compensated for.

The article "STM combined with SEM without capability limitations", A. O. Golubok, V. A. Timofeev, Ultramicroscopy 1992, vol. 42, Iss Jul, pages 1558–1563, discloses an STM probe having two small piezotubes arranged concentrically one within the other. In this design, the sample is arranged on an object carrier plate which in turn is disposed on an auxiliary plate such as to be displaceable along the x and y axes, the auxiliary plate extending above the piezotubes and paralleling the annular front faces thereof. A small tube perpendicular to the auxiliary plate is secured thereto, extends into the inner piezotube, and is attached to the inner periphery of the inner piezotube such as to be displaceable relative to the inner piezotube along the z axis. An angled arm extending rectangularly and projecting over the sample is fixed to the annular front face of the outer piezotube adjacent to the object carrier plate and carries the test prod in an oblique orientation towards the surface of the sample.

During STM operation of this arrangement, the presetting or preadjustment, i.e. the coarse adjustment of the relative position between the sample and test prod, is achieved electrically along all three axes with the help of the sectored inner piezotube by moving the sample, with the help of the abovementioned sample-carrying mechanism, in relation to the test prod which is kept stationary at least during the preadjustment procedure. Preadjustment along the z axis takes place by controlling the inner electrode of the inner piezotube such that the latter is slowly extended along its longitudinal axis (coinciding with the z axis) and quickly withdrawn (or the other way round), whereby the inertia causes the small tube extending into the inner piezotube, and thus the object carrier plate, to slide in relation to this piezotube in the +z direction (or −z direction). Preadjustment along the x and y axes takes place basically in the same manner by controlling the sectored outer electrodes of the inner piezotube such that the latter is bent to and from at different velocities, whereby the object carrier plate is made to slide along the x and y axes in relation to the auxiliary plate.

In this arrangement, scanning during the STM operation can take place both by the inner piezotube moving the sample under the stationary test prod, and by the sectored outer piezotube moving the test prod over the stationary sample.

The invention achieves the object of providing and enhancing an STM probe such that it is of simple construction ensuring a substantially smooth operation, and thus a good atomic resolution, of the STM. A further object is that the STM probe be insertable in an SEM and designed such that it ensures a high resolution of the SEM even when the SEM and STM are operated concurrently. The design of the STM probe should also allow easy rearrangement for AFM operation (Atomic Force Microscope).

According to the invention, this object is achieved by an STM probe comprising:

a sectored outer piezotube, an inner piezotube arranged concentrically in the outer piezotube, the two piezotubes having substantially the same tube length, an object carrier plate fixed to one annular front face of the inner piezotube, for carrying the sample, a head plate substantially in the form of an equilateral triangle, the head plate being mounted on the annular front face of the outer piezotube adjacent to the object carrier plate, and axially covering more than half of the circumference of this annular front face, a triangle side of the head plate crossing the tubes and comprising a recess substantially concentrical with the tubes, the object carrier plate being arranged in this recess with play on all sides, a test-prod attachment plate substantially in the form of an equilateral triangle, the test-prod attachment plate being arranged above the head plate and overlapping the latter, with associated pairs of the triangle sides of the head plate and test-prod attachment plate paralleling each other, with a triangle side of the test-prod attachment plate extending above the object carrier plate and comprising a recess and, within recess, a test-prod attachment made of an insulating material for receiving a test prod extending substantially in the tube axis, the two corner areas of the test-prod attachment plate adjacent to the recess each being provided with a fine-thread spindle screwed through the test-prod attachment plate, one end of each said spindle bearing on the smooth face of the head plate opposing the respective spindle end, the corner area of the head plate facing away from the recess is provided with a third fine-thread spindle screwed through the head plate, one end of said third spindle bearing on the smooth face of the test-prod attachment plate opposing the spindle end, and the two plates being held together by three springs engaging the corners of the plates.

According to the proposed solution of the invention, the test-prod attachment plate receiving the test prod is arranged in the form of an equilateral triangle; it bears on the head plate, mounted on the outer piezotube and likewise having the form of an equilateral triangle, by means of the fine-thread spindles screwed through the test-prod attachment plate and the head plate, respectively; the plates are fastened to each other by the springs engaging the three corners of both plates. Owing to this statically determined three-point support of the test-prod attachment plate, its relative position with respect to the head plate is always unambiguously defined, thus ensuring excellent mechanical stability of the place of the test prod and hence a stable relative position between the test prod and the sample.

In the STM probe according to the invention, the presetting of the relative position between the test prod and the sample is performed by the test prod, as the test-prod attachment plate carrying the test prod can be freely moved in a given range with respect to the head plate.

Preadjustment along the x and y axes is achieved in a manner basically similar to the preadjustment along the x and y axes according to the prior art, by controlling the sectored electrodes arranged on the exterior circumference of the outer piezotube such that the outer piezotube is slowly bent along the x and y axes and then quickly moved back to its initial position, whereby the test-prod attachment plate is made to slide with respect to the head plate in the corresponding direction, thus displacing the test prod in relation to the sample arranged on the object carrier plate. In the STM probe according to the invention, the relative position achieved between the test prod and the sample by the preadjustment procedure is extremely stable due to the abovementioned three-point support of the test-prod attachment plate and due to the fact that the test-prod attachment plate is fastened to the head plate by the three springs.

The mechanical stability of the construction of the invention is further enhanced in that the presetting of the relative position between the test prod and the sample along the z axis is carried out mechanically in accordance with the invention by means of the fine-thread spindles so that the relative position of the test prod is always unequivocally determined once it has been set. In so doing, the preadjustment along the z axis is performed in two steps; first, the test-prod attachment plate is moved along the z axis with respect to the head plate by turning the fine-thread spindles screwed through the test-prod attachment plate (coarse adjustment); then, the test-prod attachment plate is tilted with respect to the head plate, by means of the third fine-thread spindle screwed through the head plate, about the bearing positions of the two other fine-thread spindles whereby the test prod is moved substantially along the z axis (fine adjustment).

Owing to the great mechanical stability of the STM probe according to the invention, the probe is highly insensitive to acoustical or mechanical vibrations, resulting in a very good atomic resolution of the STM equipped with the STM probe according to the invention.

With the help of the STM probe of the invention, the scanning can be performed during the STM operation through the outer piezotube which is movable along the x and y axes by means of the electrodes arranged on its exterior surface, and movable along the z axis by means of the single electrode arranged on the inner surface of the outer piezotube. In this case, the test prod is passed over the (stationary) sample during scanning.

According to the invention it is preferred, however, that also the inner piezotube be sectored. This allows the scanning to be performed selectively by the outer piezotube, as mentioned above, or by the inner piezotube. In the latter case, the sample is moved under the (stationary) test prod along all three axes during the scanning. This proposal also enables both the sample and the test prod to be moved by the piezotubes during the STM operation, thus advantageously widening the scanning range.

The proposed feature that the inner piezotube carrying the object carrier plate should be made of a piezoelectric material even if the scanning is to be carried out solely by means of the outer piezotube, achieves a substantial compensation of the thermic off-set along the z axis to which tunneling during STM operation is sensitive; hence, the operation of the STM is hardly affected by varying temperatures.

On the one hand, it possible in the STM probe according to the invention to conduct the tunnel current—detected by the test prod arranged in the recess of one triangle side of the test-prod attachment plate—through a freely extending shielded lead towards an I/V converter (current/voltage converter, transducer amplifier) arranged within the STM but outside the STM probe. According to the invention, however, it is preferred to fasten the I/V converter to one of the two other triangle sides of the test-prod attachment plate and to provide in the test-prod attachment plate a shielded channel between the test prod and the I/V converter, this channel receiving the lead for conducting the tunnel current detected by the test prod to the I/V converter. This design approach has become possible only by the STM probe structure of the invention, in particular by forming the test prod attachment as a test-prod attachment plate; this design enables the distance between the test prod and the I/V converter to be reduced to a minimum, and the lead conducting the tunnel current between these two items can be arranged in a completely shielded channel, thus considerably enhancing or improving the sensitivity and noise resistance of the electrical unit consisting of the test prod, the lead and the I/V converter. Owing to its compact design, the STM probe according to the invention can be introduced into an SEM through the transfer canal thereof, thus allowing the sample surface to be observed by the STM or the SEM. In this arrangement, the STM probe in the SEM is preferably mounted on a tilting table of the SEM, permitting the STM probe to be tilted preferably between 0° and 90° with respect to the electron beam of the SEM. On the one hand, the above-described STM probe according to the invention also allows concurrent observation of the sample surface by both the SEM and the STM, resulting in the advantages of such a simultaneous operation mentioned at the beginning of the description. In this case, however, the resolution capacity of the SEM may be affected in particular by the high voltages necessary for the STM operation and applied to the electrodes of the inner and/or outer piezotube, since these high voltages may deflect the electron beam of the SEM.

According to the invention, it is preferred therefore that the object carrier plate is substantially in the form of a three-pointed star and is mounted on the annular front face of the inner piezotube by the ends of the star points, and the STM probe comprises a shielding sheet defined by the peripheral wall of the recess in the head plate and by the exterior outline of the outer piezotube along the circumference of the annular front face of the outer piezotube not covered by the head plate, the shielding sheet being coplanar with the object carrier plate and mounted on the peripheral wall of the recess and on the annular front face of the outer piezotube, the shielding sheet comprising an aperture adapted to the shape of the object carrier plate, the latter being arranged in this aperture at a distance to the aperture rim of the shielding sheet.

The proposed feature of the invention that the object carrier plate should be formed as a three-pointed star results in the annular top face of the inner piezotube being axially exposed upwardly with the exception of the locations where the point ends of the object carrier plate are seated, thus allowing an axial shielding from above to be realised.

The arrangement of the shielding sheet is rendered possible by this design of the object carrier plate and in particular only by the inventive design of the head plate of the STM probe; in this way, the electron beam of the SEM is entirely shielded from the high voltages applied the electrodes of the piezotubes such that the high voltages cannot affect the SEM electron beam, thus ensuring an excellent high resolution of the SEM even when both microscopes are operated concurrently.

According to the invention, it is further preferred that the test-prod attachment arranged in the recess of the test-prod attachment plate be shielded from outside by a shielding sheet except for an opening through which the test prod passes towards the sample. Owing to this measure, the test-prod attachment made of an insulating material is not charged by impinging primary electrons or electrons reflected from the sample surface or secondary electrons released therefrom; hence, no potential can build up at the test-prod attachment which could deflect the electron beam of the SEM. Therefore, owing to this feature of the invention, the achievable resolution of the SEM is not affected by the STM.

Figure 2:
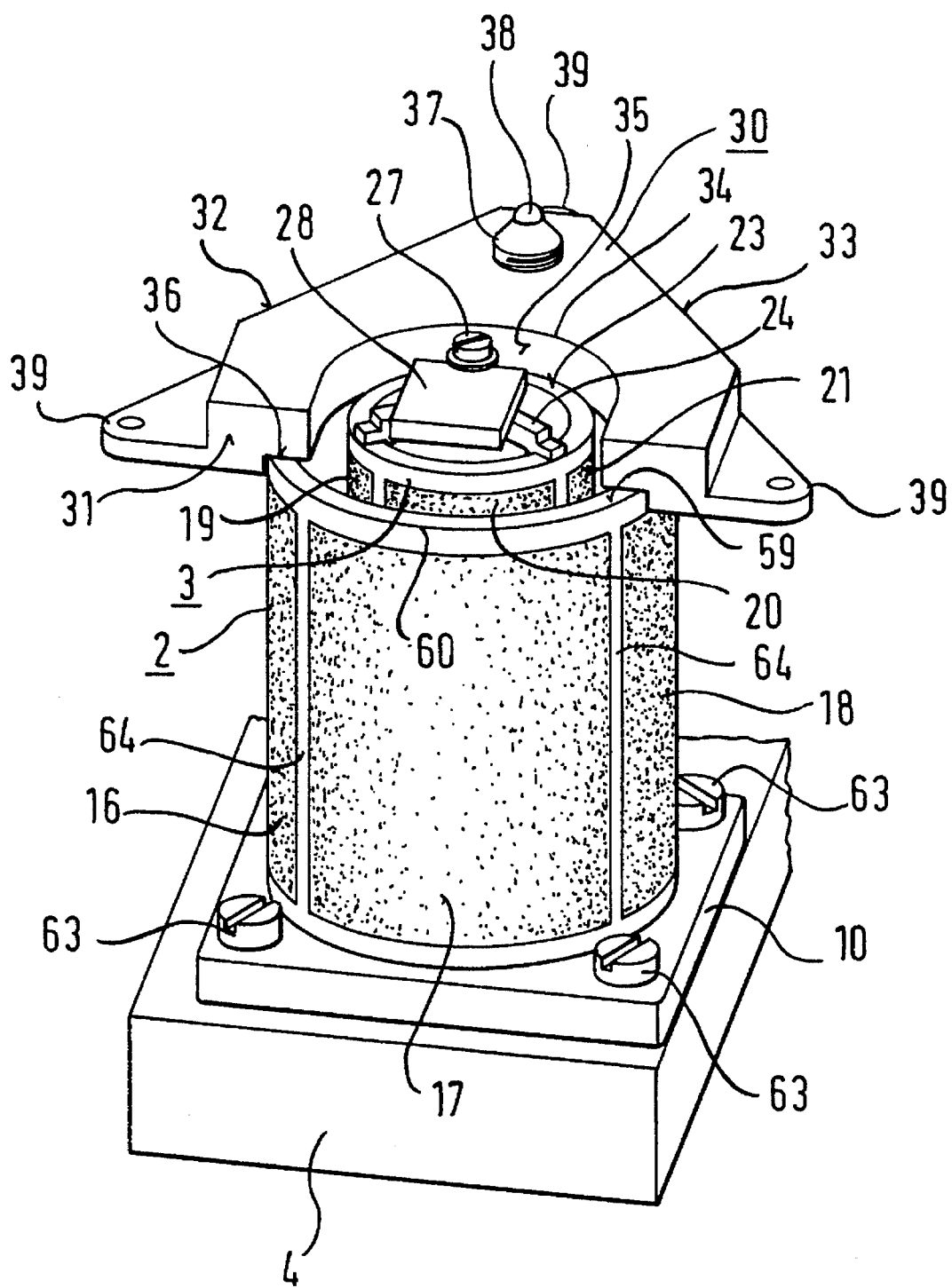
Figure 6:
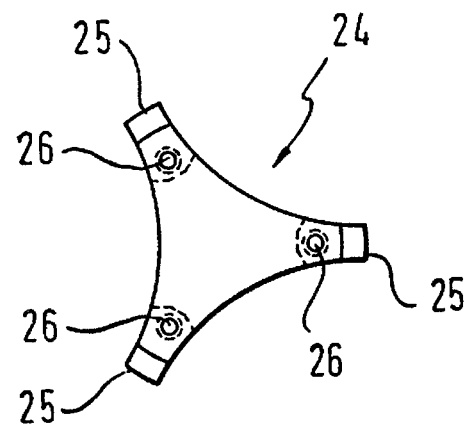
Figure 7B:
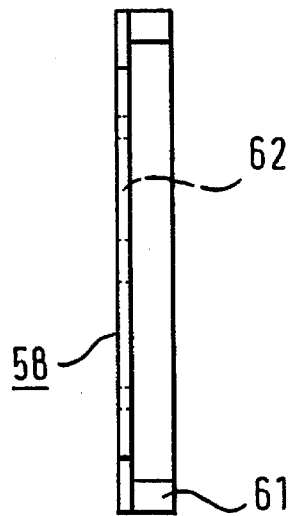
Figure 7A:
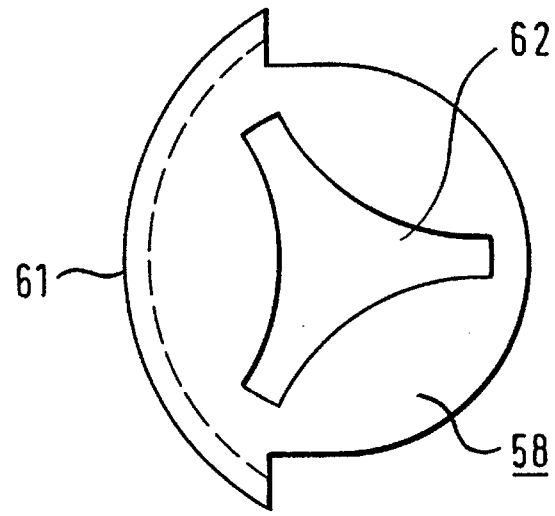

The invention will be described in greater detail below with respect to a preferred embodiment of the STM probe according to the invention, making reference to the drawings in which FIG. 1 is a perspective view of an embodiment of the STM probe according to the invention, comprising a shielding sheet and a mounted test-prod attachment plate, FIG. 2 is the perspective view of FIG. 1 without the shielding sheet and test-prod attachment plate, FIG. 3 a longitudinal sectional view of the STM probe according to the invention along line Z—Z in FIG. 1, FIG. 4 is a plan view of the head plate, FIG. 5 is a plan view of the test-prod attachment plate comprising the test-prod attachment and the I/V converter, FIG. 6 is a plan view of the object carrier plate, and FIGS. 7a and 7b are plan and side elevational views, respectively, of the shielding sheet.

Figure 3:
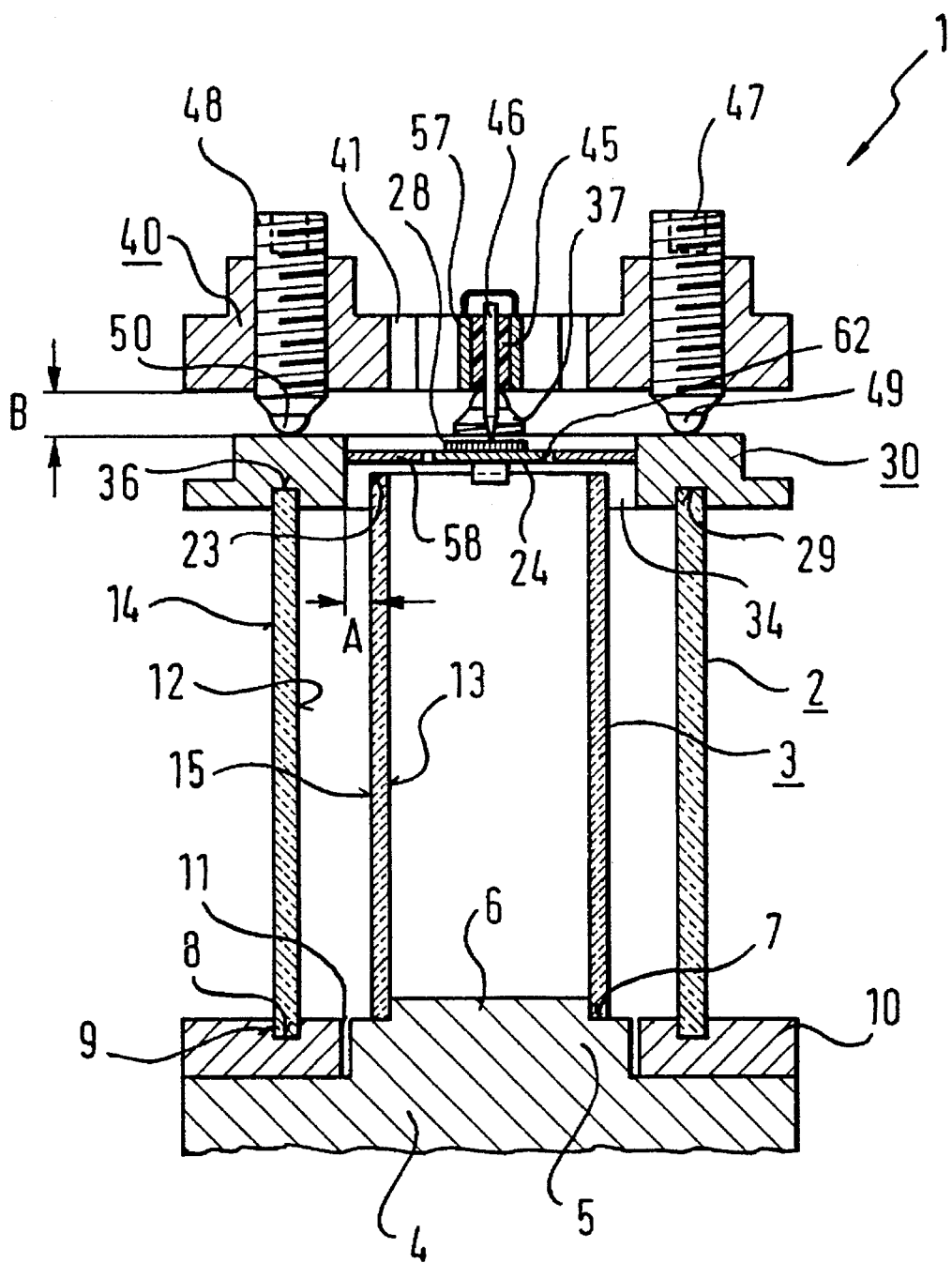

As apparent from FIGS. 1 to 3, the STM probe 1 according to the invention comprises an outer piezotube 2 within which an inner piezotube 3 is arranged extending concentrically with piezotube 2.

The inner piezotube 3 is put on a circular base plate 5, projecting from a support plate 4, such that a circular centering plate 6 projecting from base plate 5 extends slightly into the inner piezotube 3 with the periphery of base plate 5 seated on the inner surface 13 of inner piezotube 3. The annular bottom face 7 of inner piezotube 3 is firmly glued to base plate 5.

The bottom face 8 of outer piezotube 2 is glued in an annular groove 9 of a support plate 10 comprising an aperture 11 coaxial with the outer piezotube 2 for receiving the base plate 5 on the support plate 4 to support the inner piezotube 3.

The two support plates 4 and 10 are screwed together by four screws 63 (FIGS. 1 and 2). As can be seen in FIG. 3, the thickness of base plate 5, the thickness of support plate 10 and the depth of its annular groove 9 are correlated such that the inner piezotube 3 while having the same length as the outer piezotube 2, projects somewhat upwardly therefrom.

In this embodiment, both the outer and inner piezotubes 2 and 3 are sectored. This means that the entire inner surfaces 12 and 13 of piezotubes 2 and 3, respectively, each comprise a single inner electrode, while the exterior surfaces 14 and 15 of piezotubes 2 and 3, respectively, each comprise four exterior electrodes insulated from each other by axially extending insulating strips 64, each electrode covering a fourth of the cylindrical exterior surface 14 or 15, respectively. Among these four respective exterior electrodes, three can be seen, at least partially, in FIG. 2, namely the exterior electrodes 16, 17, 18 of the outer piezotube 2 and the exterior electrodes 19, 20, 21 of the inner piezotube 3.

As best seen in FIG. 2, an object carrier plate 24 made of special steel is arranged on the free end of inner piezotube 3 facing away from support plate 4; a voltage $V_{bias}$ necessary for the STM tunneling operation can be applied to the object carrier plate 24 by means of a cable (not shown). As apparent from FIG. 6, the object carrier plate 24 has the shape of a three-pointed star, and the ends 25 of its points each define a rectangular step and are firmly glued to the annular top face 23 of the inner piezotube 3. The object carrier plate 24 further comprises three threaded bores 26 provided in its points, close to the ends 25 thereof; screws 27 can be screwed into these bores, in order to fasten a sample 28 on the object carrier plate 24.

As best seen in FIGS. 2 to 4, a head plate 30 in the form of an equilateral triangle is arranged on the annular top face 29 of outer piezotube 2 adjacent to the object carrier plate 24 and axially covers slightly more than half of the circumference of annular top face 29 such that one side 31 of the triangular head plate 30 passes above the tubes 2, 3 and crosses the latter, while the other two sides 32 and 33 of the triangular head plate 30 are laterally displaced outside the tubes 2 and 3. To mount the head plate 30 on the outer piezotube 2, the face of head plate 30 opposing the outer piezotube 2 is provided with an annular partial groove 36 receiving the top end of outer piezotube 2 along the corresponding circumferential part of its annular top face 29, said top end of outer piezotube 2 being bonded to the annular partial groove 36 by an adhesive. The side 31 of the triangular head plate 30 crossing the tubes 2 and 3 has a recess 34 substantially in the form of a segment of a circle, the peripheral wall 35 of recess 34 being substantially concentrical with the tubes 2 and 3. The diameter of recess 34 is slightly greater than the outer diameter of inner piezotube 3 such as to define a distance A between the peripheral wall 35 of recess 34 and the outer surface 15 of inner piezotube 3. Further, the corner area of head plate 30 facing away from recess 34 is provided with a fine-thread spindle 37 screwed from below through head plate 30 and extending parallel to the tube axis; the top end of spindle 37 comprises a supporting ball 38. In addition, the three corners of head plate 30 are each provided with an eyelet 39 for receiving one end of a respective coil spring 56.

As can be seen in FIGS. 1, 3, 7a and 7b, the STM probe 1 comprises a shielding metal sheet 58 axially covering from above both the inner and outer piezotubes 3 and 2. For this purpose, the shielding sheet 58 has an outline corresponding to the outline of a surface defined by the peripheral wall 35 of recess 34 in head plate 30 and the exterior outline 60 of outer piezotube 2 along the circumference 59 of annular top face 29 of outer piezotube 2 not covered by head plate 30. The shielding sheet 58 is bonded to the peripheral wall 35 of recess 34 and, through a flange 61 in the form of a segment of a circle, to the annular top face 29 of outer piezotube 2 over the circumference 59 thereof, such that the shielding sheet 58 is substantially coplanar with the object carrier plate 24. The shielding sheet 58 is further provided with an aperture 62 in which the object carrier plate 24 is arranged such as to have play on all sides.

As apparent from FIG. 1, the STM probe 1 further comprises a test-prod attachment plate 40 having the shape of an equilateral triangle which is substantially congruent with the head plate 30 and is arranged above the latter in a spaced relationship. As can be seen in FIGS. 4 and 5, the outline of test-prod attachment plate 40 differs from the outline of head plate 30 only by the shape of its recess 41 provided in the triangle side 42 of test-prod attachment plate 40 passing above the object carrier plate 24 across the tubes 2 and 3. The peripheral wall of recess 41 comprises a peripheral wall portion 43 paralleling said triangle side 42 and provided with a groove 44 extending axially in the centre of the peripheral wall portion 43; in groove 44, there is arranged a test-prod attachment 45 made of an insulating material and projecting from the peripheral wall portion 43, for receiving a test prod 46 while defining a distance C between the test prod 46 and peripheral wall portion 43.

As can be further seen in FIGS. 1 and 5, the test-prod attachment 45 is externally covered on all sides by a shielding metal sheet 57. The recess 41 comprising the peripheral wall portion 43, the groove 44 formed therein and the test-prod attachment 45 are dimensioned such that the test prod 46, when inserted in the test-prod attachment 45, extends substantially in the tube axis, if the test-prod attachment plate 40—as apparent from FIG. 1—is placed and mounted on the head plate 30.

The corner areas of test-prod attachment plate 40 adjacent to the recess 41 each comprise a fine-thread spindle 47 and 48, respectively, screwed from above through the plate 40 and extending axially in the plane defined by the peripheral wall portion 43; the bottom ends of the fine-thread spindles 47, 48 are each provided with a supporting ball 49, 50 (FIG. 1).

In the test-prod attachment plate 40, there is further provided a channel 51 extending parallelly to the surface of plate 40 between the groove 44 and the triangle side 33 of the test-prod attachment plate 40, this side 33 being shown on the right-hand side of the Figures; this channel 51 receives a lead 65 between the test prod 46 and an I/V converter 52, for conducting the tunnel current detected by the test prod 46 to the I/V converter 52; the I/V converter 52 is mounted on said triangle side 33 by two screws each engaging a threaded bore 53 or 54, respectively, provided in the test-prod attachment plate 40 from the triangle side 33. In addition, the three corners of the test-prod attachment plate 40 each have an eyelet 55 for receiving the other end of the associated spring 56.

When the test-prod attachment plate 40 of the STM probe 1 is mounted on the head plate 30, these two plates 30, 40 are held together by the force of the three springs 56, each of which has one end engaging one eyelet 39 of head plate 30 while the other end engages one eyelet 55 of test-prod attachment plate 40. The distance B between the two plates 30, 40 is determined by the three fine-thread spindles 47, 48 and 37, since the supporting balls 49, 50 of the fine-thread spindles 47 and 48, respectively, bear on the smooth surface of head plate 30 opposing the test-prod attachment plate 40, and the supporting ball 38 of fine-thread spindle 37 bears on the smooth surface of test-prod attachment plate 40 opposing the head plate 30, due to the resilient force of the springs 56.

In this embodiment of the STM probe 1 according to the invention, the relative position between the test prod 46 and the sample 28 is electrically preset along the x and y axes by properly controlling the four exterior electrodes 16, 17, 18 of the outer piezotube 2 such that the test-prod attachment plate 40 is displaced with respect to the head plate 30 and, thus, the test prod 46 is displaced with respect to the sample 28. When preadjusting the probe along the z axis, it is first adjusted coarsely by setting the fine-thread spindles 47 and 48 adjacent to the recess 41, whereupon a fine adjustment is performed by rotating the third fine-thread spindle 37 in head plate 30 by means of a drive mechanism (not shown). In this arrangement, the movement of the third fine-thread spindle 37 along the z axis is transferred to the test prod 46 through a lever reduction in accordance with the leverage C/D apparent from FIG. 5. In this Figure, "D" means the distance of the axis of the third fine-thread spindle 37 from the plane including the axes of the other two fine-thread spindles 47 and 48. After completion of the fine adjustment along the z axis, the drive mechanism of the third fine-thread spindle 37 is mechanically decoupled therefrom in order to prevent this mechanism from transferring mechanical and/or acoustical disturbances, such as vibrations, to the STM probe 1.

During the STM operation, the scanning may be carried out either by the outer piezotube 2 or by the inner piezotube 3, or by both tubes 2 and 3 concurrently if desired.

Due to its compact design, the STM probe according to the invention can be easily introduced into an SEM through the transfer canal thereof, and may be tilted for SEM operation with the help of the SEM tilting table, for example. Since the outer piezotube 2 and also the inner piezotube 3 are axially shielded from above by the shielding sheet 58 and the special design of the object carrier plate 24, the voltages required for STM operation and applied to the exterior electrodes and/or the internal electrodes 16, 17, 18 and 19, 20, 21, respectively, of the piezotubes 2 and 3, respectively, do not disturb an SEM operation performed concurrently with the STM operation. The shielding of the test-prod attachment 45 by means of the shielding sheet 57 further contributes to an undisturbed SEM operation.

In the STM probe 1 according to the invention, the test-prod attachment plate 40 can be detached easily and quickly from the head plate 30 by releasing the springs 56 from the eyelets 55, as shown in FIG. 2, or from the eyelets 39, and replaced by an upper plate suitable for AFM operation, thus ensuring that the STM probe can be very easily rearranged for AFM operation. During the AFM operation, scanning can then take place by means of the inner piezotube 3.

We claim:

1. STM probe (1), in particular for use in an SEM for examining a surface of a sample (28) by STM and/or SEM operation, comprising:
   a sectored outer piezotube (2),
   an inner piezotube (3) arranged concentrically in the outer piezotube (2),
   the two piezotubes (2, 3) having substantially the same tube length,
   an object carrier plate (24) fixed to one annular front face (23) of the inner piezotube (3), for carrying the sample (28), a head plate (30) substantially in the form of an equilateral triangle, the head plate (30) being mounted on the annular front face (29) of the outer piezotube (2) adjacent to the object carrier plate (24), and axially covering more than half of the circumference of this annular front face (29), a triangle side (31) of the head plate (30) crossing the tubes (2, 3) comprising a recess (34) substantially concentrical with the tubes (2, 3), the object carrier plate (24) being arranged in this recess (34) with play on all sides, a test-prod attachment plate (40) substantially in the form of an equilateral triangle, the test-prod attachment plate (40) being arranged above the head plate (30) and overlapping the latter, with associated pairs of the triangle sides of the head plate (30) and test-prod attachment plate (40) paralleling each other, with a triangle side (42) of the test-prod attachment plate (40) extending above the object carrier plate (24) comprising a recess (41) and, within recess (41), a test-prod attachment (45) made of an insulating material for receiving a test prod (46) extending substantially in the tube axis, the two corner areas of the test-prod attachment plate (40) adjacent to the recess (41) each being provided with a fine-thread spindle (47, 48) screwed through the test-prod attachment plate (40), one end of each said spindle (47, 48) bearing on the smooth face of the head plate (30) opposing the respective spindle end, the corner area of the head plate (30) facing away from the recess (34) is provided with a third fine-thread spindle (37) screwed through the head plate (30), one end of said third spindle (37) bearing on the smooth face of the test-prod attachment plate (40) opposing the spindle end, and the two plates (30, 40) being held together by three springs (56) engaging the corners of the plates (30, 40).

2. STM probe according to claim 1, wherein the inner piezotube (3) is sectored.

3. STM probe according to claim 2, wherein the test-prod attachment (45) is shielded from outside by a shielding sheet (57) on all sides except for an opening through which the test prod (46) passes.

4. STM probe according to claim 1, comprising an I/V converter (52) attached to one of the two other triangle sides of the test-prod attachment plate (40) in which a shielded channel (51) is provided between the test prod (46) and the I/V converter (52), the channel (51) receiving a lead (65) for conducting the tunnel current detected by the test prod (46) to the I/V converter (52).

5. STM probe according to claim 4, wherein the test-prod attachment (45) is shielded from outside by a shielding sheet (57) on all sides except for an opening through which the test prod (46) passes.

6. STM probe according to claim 1, wherein the object carrier plate (24) is substantially in the form of a three-pointed star and is mounted on the annular front face (23) of the inner piezotube (3) by the ends (25) of the star points, and the STM probe (1) comprises a shielding sheet (58) defined by the peripheral wall (35) of the recess (34) in the head plate (30) and by the exterior outline (60) of the outer piezotube (2) along the circumference (59) of the annular front face (29) of the outer piezotube (2) not covered by the head plate (30), the shielding sheet (58) being coplanar with the object carrier plate (24) and mounted on the peripheral wall (35) of the recess (34) and on the annular front face (29) of the outer piezotube (2), the shielding sheet (58) comprising an aperture (62) adapted to the shape of the object carrier plate (24), the latter being arranged in this aperture (62) with a play on all sides to the aperture rim of the shielding sheet (58).

7. STM probe according to claim 6, wherein the test-prod attachment (45) is shielded from outside by a shielding sheet (57) on all sides except for an opening through which the test prod (46) passes.

8. STM probe according to claim 1, comprising an I/V converter (52) attached to one of the two other triangle sides of the test-prod attachment plate (40) in which a shielded channel (51) is provided between the test prod (46) and the I/V converter (52), the channel (51) receiving a lead (65) for conducting the tunnel current detected by the test prod (46) to the I/V converter (52), wherein the object carrier plate (24) is substantially in the form of a three-pointed star and is mounted on the annular front face (23) of the inner piezotube (3) by the ends (25) of the star points, and the STM probe (1) comprises a shielding sheet (58) defined by the peripheral wall (35) of the recess (34) in the head plate (30) and by the exterior outline (60) of the outer piezotube (2) along the circumference (59) of the annular front face (29) of the outer piezotube (2) not covered by the head plate (30), the shielding sheet (58) being coplanar with the object carrier plate (24) and mounted on the peripheral wall (35) of the recess (34) and on the annular front face (29) of the outer piezotube (2), the shielding sheet (58) comprising an aperture (62) adapted to the shape of the object carrier plate (24), the latter being arranged in this aperture (62) at a distance to the aperture rim of the shielding sheet (58).

9. STM probe according to claim 8, wherein the test-prod attachment (45) is shielded from outside by a shielding sheet (57) on all sides except for an opening through which the test prod (46) passes.

10. STM probe according to claim 1, wherein the test-prod attachment (45) is shielded from outside by a shielding sheet (57) on all sides except for an opening through which the test prod (46) passes.

\* \* \* \* \*